United States Patent
Handlin, Jr. et al.

(10) Patent No.: US 6,187,873 B1
(45) Date of Patent: Feb. 13, 2001

(54) INCREASED THROUGHPUT IN THE MANUFACTURE OF BLOCK COPOLYMERS BY REDUCTION IN POLYMER CEMENT VISCOSITY THROUGH THE ADDITION OF POLAR SOLVENTS

(75) Inventors: Dale Lee Handlin, Jr., Houston; David Ralph Stewart, Richmond; John David Wilkey, Houston, all of TX (US)

(73) Assignee: Shell Oil Company, Houston, TX (US)

( * ) Notice: Under 35 U.S.C. 154(b), the term of this patent shall be extended for 0 days.

(21) Appl. No.: 09/130,248

(22) Filed: Aug. 6, 1998

Related U.S. Application Data

(60) Provisional application No. 60/055,137, filed on Aug. 7, 1997.

(51) Int. Cl.⁷ .................................................. C08F 8/04
(52) U.S. Cl. ................................... 525/331.9; 525/333.3; 525/338; 525/339
(58) Field of Search .............................. 525/331.9, 333.3, 525/338, 339

(56) References Cited

U.S. PATENT DOCUMENTS

| | | | |
|---|---|---|---|
| 3,595,942 | * | 7/1971 | Wald et al. . |
| 3,763,044 | * | 10/1973 | Anderson . |
| 3,775,329 | * | 11/1973 | Eckert et al. . |
| 4,136,047 | * | 1/1979 | Rogan et al. ............................ 252/59 |
| 4,337,329 | * | 6/1982 | Kubo et al. ............................ 525/339 |
| 4,599,401 | * | 7/1986 | Koleske ................................ 528/408 |
| 4,673,714 | * | 6/1987 | Kishimoto et al. ................... 525/314 |
| 5,039,755 | * | 8/1991 | Chamberlain et al. ............... 525/338 |
| 5,165,440 | * | 11/1992 | Johnston ................................ 137/13 |
| 5,229,464 | * | 7/1993 | Erickson et al. ...................... 525/314 |
| 5,268,415 | * | 12/1993 | Pieterse et al. ....................... 524/557 |
| 5,352,744 | * | 10/1994 | Bates et al. ........................... 525/339 |
| 5,820,806 | * | 10/1998 | Cloos et al. .......................... 264/203 |
| 5,916,941 | * | 6/1999 | St. Clair . |
| 5,948,869 | * | 9/1999 | Vallieri et al. ........................ 502/115 |
| 5,985,995 | * | 11/1999 | Calle et al. ............................. 525/52 |
| 6,020,439 | * | 2/2000 | Ko et al. ................................ 525/338 |
| 6,087,455 | * | 7/2000 | Lange et al. .......................... 525/338 |

\* cited by examiner

*Primary Examiner*—Jeffrey C. Mullis
(74) *Attorney, Agent, or Firm*—Donald F. Haas

(57) ABSTRACT

This invention is an improvement upon the current process for the production of block copolymers, especially hydrogenated block copolymers, of conjugated dienes and/or vinyl aromatic hydrocarbons which comprises anionically polymerizing the monomers in an inert hydrocarbon solvent in the presence of an alkali metal initiator whereby a polymer cement is produced and then contacting the cement with hydrogen under hydrogenation conditions in the presence of a hydrogenation catalyst. This invention and the improvement to the foregoing process comprises reducing the viscosity of the polymer cement by adding to it, preferably prior to hydrogenation (if the polymer is to be hydrogenated), from 2 to 50 % wt of a polar compound. The polar compound must be a poorer solvent for the block copolymer than is the inert hydrocarbon solvent. Preferred polar compounds include diethyl ether, tetrahydrofuran, diethoxyethane, monoglyme, diglyme, diethoxypropane, dioxane ortho-dimethoxybenzene, and the like.

4 Claims, No Drawings ced throughput in the Manufacture of Block Copolymers by Reduction in Polymer Cement Viscosity Through the Addition of Polar Solvents This application claims the benefit of U.S. Provisional Application No. 60/055,137 filed Aug. 7, 1997, the entire disclosure of which is hereby incorporated by reference.

FIELD OF THE INVENTION

This invention relates to the manufacture of block copolymers of conjugated dienes and/or vinyl aromatic hydrocarbons by anionic polymerization of these monomers in a hydrocarbon solvent. More particularly, this invention relates to an improvement in such a process whereby the throughput of the manufacturing system is increased by reducing the viscosity of the polymer cement (the solution/slurry/suspension of the anionic polymer in the hydrocarbon solvent).

BACKGROUND OF THE INVENTION

Polymers of conjugated dienes and/or vinyl aromatic hydrocarbons have been produced by numerous methods. However, anionic polymerization of such dienes in the presence of an anionic polymerization initiator is the most widely used commercial process. The polymerization is carried out in an inert solvent such as hexane, cyclohexane, or toluene and the polymerization initiator is commonly an organo alkali metal compound, especially alkyl lithium compounds. The solvent used is almost always a non-polar hydrocarbon because such solvents are much better solvents for the conjugated diene blocks of the block copolymers which usually form the largest part of the block copolymers.

As the polymer is created from the monomers, a solution/slurry/suspension of the polymer forms in the inert hydrocarbon solvent. This solution/slurry/suspension is called the polymer cement. These polymerizations may be carried out at a variety of solids contents and it is reasonably obvious that if the process can be run at high solids content, the manufacturing cost will be decreased because the cost of solvent will be decreased and more polymer can be produced in a given amount of time.

Unfortunately, with polymer cements of these block copolymers, one of the most significant rate limiting aspects is the viscosity of the polymer cement. For instance, in order to achieve a reasonable efficiency in the removal of hydrogenation catalyst residue from the polymer cement, the viscosity of the polymer cement must not be more than 1000 cp at 80° C. Some of the desired hydrogenated block copolymers can achieve this viscosity requirement so hydrogenation catalyst residue can be efficiently removed at 20% solids, some at 15% solids, but there are other block copolymers that can only achieve the viscosity requirement in polymer cements at close to 10% solids. The manufacturing cost of such hydrogenated block copolymers is therefore much higher. It can be seen that there would be a significant advantage achieved if a way could be found to utilize the current manufacturing technology but decrease the polymer cement viscosity for enhanced catalyst residue removal at higher solids contents so more polymer can be produced in a given amount of time.

It would be desirable to operate the process at a higher solids content in the cement if the same amount of catalyst removal could be achieved in the same amount of time. More polymer would be produced then in a given amount of time. Alternatively, it would be advantageous to be able to decrease the time it takes to remove the desired amount of catalyst residue while operating at the same solids content. The total throughput time would thus be decreased. Another result which would be highly advantageous would be to operate at the same conditions as are presently used (time, solids content, etc.) and thus remove more of the residual hydrogenation catalyst. The present invention provides a method for achieving these goals.

SUMMARY OF THE INVENTION

This invention is an improvement upon the current process for the production of block copolymers, especially hydrogenated block copolymers, of conjugated dienes and/or vinyl aromatic hydrocarbons which comprises anionically polymerizing the monomers in an inert hydrocarbon solvent in the presence of an alkali metal initiator whereby a polymer cement is produced and then contacting the cement with hydrogen under hydrogenation conditions in the presence of a hydrogenation catalyst, and separating the metal residues from polymerization and hydrogenation from the polymer cement. This invention and the improvement to the foregoing process comprises reducing the viscosity of the polymer cement by adding to it, preferably prior to hydrogenation (if the polymer is to be hydrogenated), from 2 to 50% by weight (% wt) of a polar compound. The polar compound must be a poorer solvent for the rubber block than the inert hydrocarbon solvent from polymerization and effect a contraction of the rubber (polymer) coil. Preferred polar compounds include diethyl ether, tetrahydrofuran, diethoxyethane, monoglyme, diglyme, diethoxypropane, dioxane, ortho-dimethoxybenzene, and the like.

DETAILED DESCRIPTION OF THE INVENTION

As is well known, polymers containing both ethylenic and/or aromatic unsaturation can be prepared by copolymerizing one or more polyolefins, particularly a diolefin, by themselves or with one or more alkenyl aromatic hydrocarbon monomers. The polymers may, of course, be random, tapered, block or a combination of these, as well as linear, star or radial.

Polymers containing ethylenic unsaturation or both aromatic and ethylenic unsaturation may be prepared using anionic initiators or polymerization catalysts. Such polymers may be prepared using bulk, solution or emulsion techniques. In any case, the polymer containing at least ethylenic unsaturation will, generally, be recovered as a solid such as a crumb, a powder, a pellet or the like. Polymers containing ethylenic unsaturation and polymers containing both aromatic and ethylenic unsaturation are, of course, available commercially from several suppliers.

In general, when solution anionic techniques are used, conjugated diolefin polymers and copolymers of conjugated diolefins and alkenyl aromatic hydrocarbons are prepared by contacting the monomer or monomers to be polymerized simultaneously or sequentially with an anionic polymerization initiator such as Group IA metals, their alkyls, amides, silanolates, napthalides, biphenyls and anthracenyl derivatives. It is preferred to use an organoalkali metal (such as sodium or potassium) compound in a suitable solvent at a temperature within the range from about −150° C. to about 300° C., preferably at a temperature wit hin the range from about 0° C. to about 100° C. Particularly effective anionic polymerization initiators are organolithium compounds having the general formula:

$RLi_n$

Wherein:

R is an aliphatic, cycloaliphatic, aromatic or alkyl-substituted aromatic hydrocarbon radical having from 1 to about 20 carbon atoms; and n is an integer of 1 to 4.

Conjugated diolefins which may be polymerized anionically include those conjugated diolefins containing from 4 to about 12 carbon atoms such as 1,3-butadiene, isoprene, piperylene, methylpentadiene, phenylbutadiene, 3,4-dimethyl-1,3-hexadiene, 4,5-diethyl-1,3-octadiene and the like. Conjugated diolefins containing from 4 to about 8 carbon atoms are preferred for use in such polymers. Alkenyl aromatic hydrocarbons that may be copolymerized include vinyl aryl compounds such as styrene, various alkyl-substituted styrenes, alkoxy-substituted styrenes, 2-vinyl pyridine, 4-vinyl pyridine, vinyl naphthalene, alkyl-substituted vinyl naphthalenes and the like.

In general, any of the inert hydrocarbon solvents known in the prior art to be useful in the preparation of such polymers may be used. Suitable solvents, then, include straight- and branched-chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as, alkyl-substituted derivatives thereof; aromatic and alkyl-substituted derivatives thereof; aromatic and alkyl-substituted aromatic hydrocarbons such as benzene, naphthalene, toluene, xylene and the like; hydrogenated aromatic hydrocarbons such as tetralin, decalin and the like.

The polymers of this invention may be hydrogenated as disclosed in U.S. Patent Reissue 27,145, which is herein incorporated by reference. The hydrogenation of these polymers and copolymers may be carried out by a variety of well established processes including hydrogenation in the presence of such catalysts as Raney Nickel, noble metals such as platinum and the like, soluble transition metal catalysts and titanium catalysts as in U.S. Pat. No. 5,039,755, which is also incorporated herein by reference. The polymers may have different diene blocks and these diene blocks may be selectively hydrogenated as described in U.S. Pat. No. 5,229,464, which is also incorporated herein by reference.

The catalyst residue extraction is generally carried out by washing the hydrogenated polymer cement with an aqueous acid although washing with water only has been used successfully and there are other well-known extraction methods. The aqueous acid is usually a mineral acid such as phosphoric acid or sulfuric acid. Carboxylic acids, especially citric acid, may also be used. The cement is generally mixed with the acid for a period of time after which the mixture is allowed to settle. The acid phase is then decanted from the cement phase. This step is often repeated at least once. The cement phase is then substantially free of metals.

As discussed above, the viscosity of the polymer cement has an important effect on the throughput of the polymer in the manufacture of the polymer and especially in the removal of catalyst residue subsequent to the hydrogenation of the polymer. Block copolymers of conjugated dienes and vinyl aromatic hydrocarbons generally must have a polymer cement viscosity of less than 4000 cp at 60° C. in order for the hydrogenation catalyst residue to be removed successfully in a reasonable amount of time.

There are two mechanisms that determine the viscosity of block copolymer cements. The first is the normal presence of entanglements and resistance to flow of the solvent through the polymer. The second is the presence of a network due to phase separation of the vinyl aromatic hydrocarbon (usually styrene) blocks and the diene blocks. It has been understood in the past that the known approaches to reducing the viscosity due to one of these mechanisms would increase the viscosity due to the other mechanism.

Decreasing, the polymer cement viscosity as described herein does allow increased throughput through the plant and can also result in improved product quality without increasing the cost of manufacture. One approach which this invention allows is to operate at the same solids content as in current operations. The cement of this invention is lower in viscosity and the catalyst extraction can be carried out more quickly and more efficiently since the contacting and settling, time required for the lower viscosity cement would be significantly less.

Alternatively, the solids content of the invention cement could be increased significantly to the level wherein its viscosity is at the level of the polymer cement for the conventional polymer. Under these conditions, the processing time would be the same (same settling time, etc.) but the amount of polymer actually processed would be substantially more because more polymer (by weight) would be present in the cement.

Another manner in which the process of this invention could be carried out would lead to enhanced product quality. A combination of the first two approaches could be used to accomplish this or the invention polymer cement could be treated at exactly the same set of conditions as are used for the present polymer, i.e., the same solids content, mixing times, etc. The efficiency of the catalyst residue removal process would be greatly enhanced by the lower viscosity and more catalyst residue could be removed, thus producing a higher quality product at the same cost.

Microstructure control of conjugated diene polymers or conjugated diene polymer blocks within polymers is important because a controlled degree of branching in the polymer is desirable. If, such as in the case of butadiene, the diene in the polymer is all straight chain, such as 1,4-polybutadiene, when the polymer is hydrogenated it will be polyethylene and have crystallinity. In order to achieve good thermoplastic elastomeric properties in the polymer, it is desirable that the microstructure include a uniform specific degree of branching or vinyl content, such as 1,2-butadiene possesses. Including a microstructure control agent in the polymerization mixture commonly effects the desired control of the microstructure to include a desired amount of branching or vinyl content. The desired level of vinyl content is achieved by properly selecting the type and the amount of these microstructure control agents, which are commonly Lewis basic compounds. Such compounds have included ether compounds and tertiary amines. Some of these agents, for instance, diethyl ether, tetrahydrofuran, diethoxyethane, monoglyme, diglyme, diethoxypropane, dioxane, ortho-dimethoxybenzene, and the like, are among those polar compounds which can be used herein to reduce the viscosity of the polymer cement.

In general, from 100 to 300 ppm of the microstructure control agent is used. This amount is too low to be sufficiently effective in reducing the viscosity of the polymer cement. It is desired that the viscosity be lowered by an amount sufficient to increase throughput by at least 10%. In order to accomplish this, the polar compound must be present in the polymer cement in an amount from 2 to 50% by weight (% wt). Preferably, the amount of the polar compound present in the polymer cement is from 4 to 26% wt because this range strikes a practical balance between viscosity reduction and solids dilution.

EXAMPLES

Example 1

Solutions (they were not actually cements because they were not formed during the polymerization but were made with previously manufactured polymers) of four different hydrogenated block copolymers were prepared. This is a good comparison since the viscosity of the cements is highest after hydrogenation and the viscosity limitation of the overall process is in the hydrogenation catalyst extraction step for the reasons cited above. The solutions in cyclohexane and/or diethylether were prepared by shaking at room temperature over a period of several days. The viscosity measurements were made in a Rheometrics Pressure Rheometer at a constant pressure of 120 psi which serves to maintain the solvent composition but has a negligible effect on the viscosity of the solution. The measurements were made in steady shear at shear rates from 0.1 to 1000 sec$^{-1}$. Measurements were made at 23, 40, 60, 75, and 90° C. The solids contents were checked by evaporation after rheology testing and found to be within 0.1% wt solids of the nominal solids contents in all cases.

Polymer 1 is a linear hydrogenated styrene-butadiene-styrene block copolymer having a weight average molecular weight of about 190,000 g/mole. At 15% wt solids content, diethyl ether was added as the polar compound in concentrations of 0, 4, 14, and 25.5% wt. At 12.5% wt solids, 3.5% wt diethyl ether (DEE) was added and at 10% wt solids 4% wt DEE was added. Polymer 2 is a hydrogenated star polymer of isoprene having an arm weight average molecular weight of 35,000 g/mole. At 12% wt solids, 0 and 26.4% wt DEE was added. Polymer 3 is a hydrogenated star polymer of styrene-isoprene blocks having an arm weight average molecular weight of 54,000 g/mole. At 15% wt solids, 0 and 25.5% wt DEE was added. Solutions at 10 and 12.5% wt solids were without DEE were tested. Polymer 4 is a hydrogenated styrene-isoprene diblock copolymer having a weight average molecular weight of about 197,000 g/mole. At 15% wt solids, 0 and 25.5% wt DEE was added.

The results are shown in Tables 1 and 2. Table 1 shows the ratios of the viscosities of solutions with 25.5% wt DEE to the viscosities at the same solids content without the polar compound. It can be seen that for all four of these different block copolymers, the viscosity is dramatically decreased by the addition of DEE. Table 2 contains the viscosity measurement data for all of the solutions tested. The viscosity lowering effect of the DEE is readily apparent from this data as well.

TABLE 1

| Polymer | 23° C. | 40° C. | 60° C. | 75° C. | 90° C. |
|---|---|---|---|---|---|
| 1 | 0.140 | 0.307 | 0.494 | 0.551 | 0.606 |
| 2 | 0.461 | 0.504 | 0.537 | 0.546 | 0.561 |
| 3 | 0.471 | 0.510 | 0.537 | 0.556 | 0.565 |
| 4 | 0.468 | 0.502 | 0.552 | 0.565 | 0.553 |

TABLE 2

Actual Measured Viscosity (cP)

| Polymer | Solids (% wt) | DEE (% wt) | 23° C. | 40° C. | 60° C. | 75° C. | 90° C. |
|---|---|---|---|---|---|---|---|
| 1 | 15 | 0 | 125,000 | 16,800 | 4090 | 2070 | 1130 |
| 1 | 15 | 4 | 74,400 | 12,100 | 3440 | 1790 | 1020 |
| 1 | 15 | 14 | 28,900 | 7210 | 2470 | 1401 | 835 |
| 1 | 15 | 25.5 | 17,500 | 5160 | 2020 | 1140 | 685 |
| 1 | 12.5 | 3.5 | 7700 | 2100 | 930 | 581 | 366 |
| 1 | 10 | 4 | 1240 | 536 | 279 | 187 | 127 |
| 2 | 12 | 0 | 445 | 250 | 147 | 103 | 74.1 |
| 2 | 12 | 26.4 | 205 | 126 | 78.9 | 56.2 | 41.6 |
| 3 | 15 | 0 | 3560 | 1880 | 1030 | 692 | 483 |
| 3 | 15 | 25.5 | 1680 | 959 | 553 | 385 | 273 |
| 3 | 12.5 | 0 | 1430 | 813 | 453 | 319 | 221 |
| 3 | 10 | 0 | 590 | 338 | 197 | 142 | 98.4 |
| 4 | 15 | 0 | 17,800 | 9140 | 4690 | 3100 | 2080 |
| 4 | 15 | 25.5 | 8330 | 4590 | 2590 | 1750 | 1150 |

Example 2

The following comparative experiment shows the value of decreasing polymer cement viscosity on the efficiency of hydrogenation catalyst residue removal. In this case, the viscosity was not lowered by the process of this invention.

The extractions were performed in a continuous extraction system comprising three identical extraction columns, each of 1.3 gallons volume, four inches in diameter, with a length to diameter ratio of 6:1. Each column was subdivided into 6 baffled zones each fitted with a two-inch diameter flat-blade turbine mixer rotating at 1800 rpm. Cement samples for analytical testing were drawn from the settler following each column. The flow rate was adjusted to provide 30 minutes residence time in each extractor. The polymer cement fed to the extractors consisted of a hydrogenated styrene-butadiene-styrene block copolymer with number-average molecular weight of 190,000 g/mole, of which about 30% by weight is styrene, dissolved in cyclohexane at the concentration given below. In addition, dilute sulfuric acid (0.3 wt %) was fed in a countercurrent fashion at a ratio of 0.64 lb/lb on cement. Dilute oxygen (3% in nitrogen) was fed upflow through the first column only.

TABLE 3

| | Solids | Temp. | Viscosity | NI (ppm in cement) | | | |
|---|---|---|---|---|---|---|---|
| Ex. # | Wt. % | ° C. | centipoise | t = 0 min | 30 | 60 | 90 |
| 1 | 12.4 | 65 | 920 | 101.2 | 59.0 | 33.1 | 23.1 |
| 2 | 7.9 | 65 | 75 | 66.1 | 7.3 | 1.7 | 0.7 |

We claim:

1. A process for removing catalyst residues from polymer cements, comprising:

anionically polymerizing a conjugated diene in an inert hydrocarbon solvent to form a polymer cement;

adding from 2 to 50% wt of diethyl ether to the polymer cement, wherein the diethyl ether is a poorer solvent for polymerized conjugated diene than the inert hydrocarbon solvent;

hydrogenating the polymer cement; and removing catalysts residues from the polymer cement.

2. The process of claim 1, wherein the polymers cement comprises block copolymers of the conjugated diene and a monovinyl aromatic compound.

3. The process of claim 1, wherein the inert hydrocarbon solvent is cyclohexane.

4. The process of claim 3, wherein the conjugated diene is butadiene and the monovinyl aromatic compound is styrene.

* * * * *